United States Patent [19]

Walter

[11] Patent Number: 4,879,764
[45] Date of Patent: Nov. 7, 1989

[54] APPARATUS AND METHOD FOR ALIGNMENT OF FIXED COMMUNICATION LASER STATIONS

[75] Inventor: Richard K. Walter, Manheim, Pa.

[73] Assignee: Laser Communications, Inc., Lancaster, Pa.

[21] Appl. No.: 55,128

[22] Filed: May 28, 1987

[51] Int. Cl.$^4$ ............................................. H04B 9/00
[52] U.S. Cl. ..................................... 455/607; 455/617
[58] Field of Search ............... 455/600, 603, 604, 606, 455/607, 617, 618, 612, 613, 609, 610

[56] References Cited

U.S. PATENT DOCUMENTS

| | | | |
|---|---|---|---|
| 2,982,859 | 5/1961 | Steinbrecher | 455/617 |
| 3,155,828 | 11/1964 | Golay | 455/619 |
| 3,156,825 | 11/1964 | Lines | 455/606 |
| 3,316,800 | 5/1967 | Kibler | 455/609 |
| 3,404,403 | 10/1968 | Vallese | 455/609 |
| 3,499,713 | 3/1970 | Ito | 455/609 |
| 3,989,942 | 11/1976 | Waddoups | 455/605 |
| 4,209,689 | 6/1980 | Linford | 455/609 |
| 4,249,265 | 2/1981 | Coester | 455/606 |
| 4,330,204 | 4/1982 | Dye | 455/607 |
| 4,603,975 | 8/1986 | Cinzori | 455/606 |
| 4,684,248 | 8/1987 | Cinzori | 455/617 |
| 4,696,062 | 9/1987 | La Budde | 455/612 |

FOREIGN PATENT DOCUMENTS

0051631 3/1984 Japan ..................................... 455/613

*Primary Examiner*—Robert L. Griffin
*Assistant Examiner*—Leslie Van Beek
*Attorney, Agent, or Firm*—Martin Fruitman

[57] ABSTRACT

An alignment system for a two-way laser communication station. Each station is constructed so that the optical receiver portion is pre-aligned to be parallel to the cabinet base structure, and a multiple point screw adjustment is used to align the laser source and columnating lens assembly with the cabinet after the weatherproof enclosure is sealed. Actual alignment is accomplished by making the adjustment while operating two stations as complimentary transmitters and receivers over a long test path which has been optically aligned.

4 Claims, 2 Drawing Sheets

APPARATUS AND METHOD FOR ALIGNMENT OF FIXED COMMUNICATION LASER STATIONS

SUMMARY OF THE INVENTION

This invention relates generally to light wave communications and more specifically to a laser beam alignment system.

Although a typical unidirectional laser communication link requires only that the laser transmitter be properly aimed at the photodetector of the receiver, the criteria for a two-way laser communication system, one in which laser signals are transmitted in both directions between similar stations, is much more stringent. In such a system the laser beams must not only be targeted upon the receiving photodetectors, but the alignment of both laser beams must be parallel. If the beams are not parallel, the two beams will diverge, and, at large distances between stations, when one laser beam is aimed at its receiving photodetector, the other returning laser beam may miss its receiving photodetector which is located very close to the transmitter laser.

The manufacture and installation of a unitized laser transmitter and receiver station therefore requires much greater care and precision in regard to alignment than does the simple unidirectional laser link.

Moreover, this problem with a combined laser transmitter and receiver is further complicated by the necessary mechanical association between the optical systems and the cabinetry in which they are mounted. Clearly, mounting the cabinet of one laser communication station in perfect alignment with the cabinet of a second station assures nothing in the way alignment if the relationships between the cabinet and the laser source, the laser lens, the photodetector, and the photodetector lens are not also controlled.

It should also be appreciated that since the electronics, the laser and the optical elements must be protected from dust and weather, a tightly sealed cabinet is a virtual requirement for a reliable laser link station, and the very action of attaching weatherproof covers to a frame invariably creates enough distortion in that frame to destroy alignments which have previously been fixed.

The present invention addresses these problems of alignment by furnishing an apparatus which permits permanent alignment of the two laser beams of a two station communication link after complete assembly and sealing of the units.

This is accomplished by fixing the photodetector's position and relationship to the cabinets so that the photodetector's received beam is parallel to the base of the cabinet, and providing an external adjustment system for the more critical transmitting laser alignment, so that it can be aligned to be parallel to the cabinet while in actual test operation.

Since the photodetector and its optical system are less critical in regard to alignment, it is practical to install the photodetector in a relatively rigid and non-varying location of the cabinet frame, for instance, supported at a corner of the frame which is attached to the rigid base plate. With the photodetector thus aligned to be parallel to the baseplate, any variation which may occur when the cover is attached is inconsequential because the photodetector is not so critically directional sensitive.

The laser transmitter and its columnating lens is, on the other hand, extremely directional sensitive. The slightest deviation from the desired path to its intended receiver will cause the beam to miss the receiver and destroy the function of the system. Nevertheless, if the only requirement were that the laser transmitter's beam hit its receiver it would only be a matter of aiming the one beam correctly by adjusting the tilt of the cabinet. In a two way system, however, tilting the cabinet would cause the other laser beam coming back to the station to miss the station's receiver.

The present invention, therefore adjusts the laser transmitter relative to the frame so that the laser transmitter and optical receiver, each being parallel to the cabinet frame, are also parallel to each other. This is accomplished after the unit is completely enclosed and weatherproofed, and, in fact, even after a time delay after sealing so that the rubberized cover gasket has had time to relax and take its initial set after the pressure of the cover has been applied.

The actual adjustment is accomplished by supporting the laser and columnating lens assembly from the front side of the cabinet which itself is rigidly attached to the bottom of the frame. The support structure is a pivot point and a group of threaded rods or jack screws, which are assembled through threaded holes in the cabinet front. These threaded rods are rotatable and in contact with a mounting block which is behind and approximately parallel to the cabinet front. The transmitting laser is attached to the mounting block, and the columnating lens, which is also attached to the mounting block, protrudes out from the mounting block and is pivoted within and protrudes through the cabinet front in the same direction and approximately parallel to the threaded rods.

Therefore, any adjustment of one of the threaded rods, of which there are typically four, will tilt the mounting block relative to the cabinet front and therefore tilt the columnating lens relative to the cabinet front and the cabinet base. Since the photodetector has been fixed in parallel relationship with the cabinet base, rotation of any of the several threaded support rods varies the parallelism of the laser and columnating lens relative to the photodetector.

The threaded rods are designed to be flush with or slightly recessed in the cabinet front and have slotted heads, so that even with the cabinet completely sealed up, they are available for adjustment.

The invention therefore permits the precise alignment of the transmitting and receiving sections of a laser communication station after the cabinet is completely closed and sealed. The laser beam of a communicating station can thus be oriented precisely parallel to its cabinet and to its photodetector. When each production unit is aligned in such a manner, installation in the field then requires that only one transmitter be properly aimed at its receiver and the corresponding return laser will also be properly aligned. Moreover, alignment of the pair of units is greatly simplified because such alignment can be based on the optical alignment of the cabinets. With the cabinets located in parallel and in a line of sight the user can be assured that each laser station will be able to communicate with the other and the communication link will be complete.

DETAILED DESCRIPTION OF THE INVENTION

Figure 1:
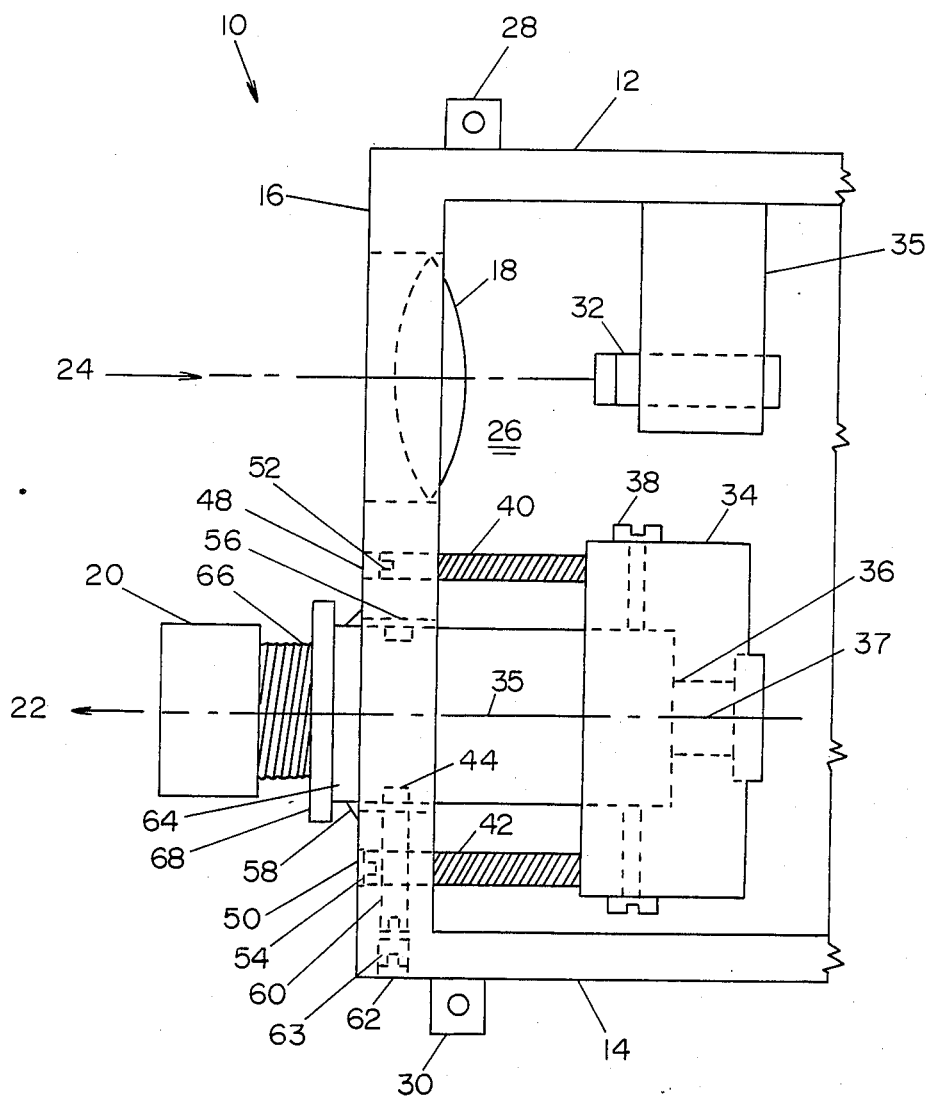
FIG. 1 is a simplified partial top view of a laser communication transmitter-receiver station with the top cover removed to show the preferred embodiment of the invention.

The preferred embodiment of the invention is shown in FIG. 1 which is a simplified partial top view of transmitter-receiver station 10 with its top cover removed to view the invention.

In FIG. 1 cabinet sides 12 and 14 and cabinet front 16 enclose the components within station 10, and receiving lens 18 and transmitting columnating lens 20 penetrate cabinet front 16 for transmission and focusing of transmitted laser beam 22 and received laser beam 24. Cabinet base plate 26 has anchors 28 and 30 attached to it in order to install station 10 for normal operation.

Photodetector 32 is rigidly attached to cabinet side 12 and cabinet base plate 26 by support 35 to which it is bonded, and it is oriented so as to be parallel to the two planes of cabinet side 12 and cabinet base plate 26. Moreover, it is also in a direct line with the center of receiving lens 18. This orientation of photodetector 32 is determined by the sizes and shapes of the manufactured parts and varies only by the tolerances of manufacture. As discussed previously, minor variations in this orientation have no significant effect on the photodetector's operation because photodetector 32 is not exceptionally directionally sensitive. Therefore, if photodetector is slightly askew from the parallel orientation, received laser beam 24, transmitted through receiving lens 18, will still affect photodetector to the same extent as if it were exactly parallel to the cabinet sides. The vital requirement of the system is rather that transmitted laser beam 22 be exactly parallel to received laser beam 24.

This goal is accomplished by adjusting the orientation of transmitted laser beam 22 so that it is parallel to the planes of cabinet base plate 26 and cabinet side 12. This adjustment is possible because lens mount 64 is rigidly attached to mounting plate 34 and lens centerline 35 is located on centerline 37 of laser source 36 and parallel to centerline 37 of laser source 36. Laser source 36 is also mounted on mounting plate 34.

The orientations of columnating lens 20 and laser source 36 relative to mounting plate 34 are determined by the machining clearances during manufacture of mounting plate 34 and lens mount 64, and these can be held very closely. Clamp screws 38 are used to lock lens mount 64 into mounting plate 34.

Jack screws 40 and 42, which are essentially threaded rods, are the means by which transmitted beam 22 is adjusted. Annular groove 44 in lens mount 64 is engaged by pivot screw 60 in hole 62, thus capturing lens mount 64, lens 20, and mounting plate 34. Jack screws 40 and 42 then push against mounting plate 34 to tilt it in one or the other direction.

Jack screws 40 and 42 are attached to cabinet front 16 at threaded holes 48 and 50 respectively, and are thus supported from cabinet front 16. Typically, there are four jack screws, one at each corner of mounting plate 34. Holes 48 and 50 also permit access to screwdriver slots 54 and 52 in the ends of jack screws 40 and 42 so that they can easily be rotated from outside station 10.

Lens mount 64 penetrates cabinet front 16 through clearance hole 56 which therefore permits the slight tilting of lens 20 which results during the alignment procedure. However, flexible sealant 58 is used to seal the excess opening around lens mount 64 to prevent moisture and dust from entering, but it nevertheless permits the slight movement required between cabinet front 16 and lens mount 64. A cover screw 63 is used in hole 62 to prevent access to and release of pivot screw 60 which would destroy the laser beam alignment.

Lens 20 also includes a beam diameter adjustment for transmitted laser beam 22. This adjustment can be accomplished by turning lens 20 within lens mount 64 so that threads 66 cause it to move closer to or farther from laser source 36. Once the appropriate beam diameter is reached, lock nut 68 is tightened to prevent further movement.

Figure 2:
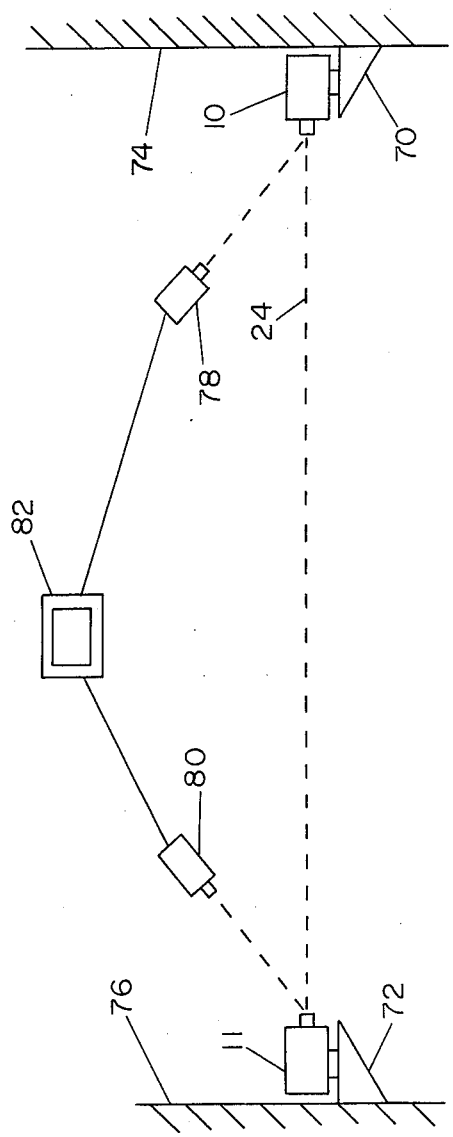
FIG. 2 is a simplified schematic view of the system layout for aligning the lasers of the invention into parallel orientation.

FIG. 2 is a simplified schematic view of the system layout used during the laser alignment procedure. It should be understood that the goal of the procedure is to align the laser beams generated at two different transmitter-receiver stations 10 and 11 so that the two beams are parallel to each other and therefore do not diverge enough to cause one transmitted beam to miss the photodetector at the other station while its own photodetector is receiving the other transmitted laser beam.

To accomplish the alignment, both stations must be mounted and anchored on immovable stands, for instance, stands 70 and 72 which are themselves mounted upon stable walls 74 and 76. In the manufacturer's test facility immovable stands 70 and 72 have been optically aligned so that when stations 10 and 11 are installed the stations are in exact alignment and the sides and bases of station cabinets are exactly parallel.

The alignment procedure is then quite simple by virtue of the construction of the present invention. Cameras 78 and 80 are used to view the orientation of the laser beams on receiving lens 18 (FIG. 1) of each station. The cameras are used both because many laser frequencies are invisible to the naked eye and also because direct viewing of the laser beam could be damaging to the eye.

Using electronic display 82 to view one station at a time, for instance station 10, the orientation of received laser beam 24 (FIG. 1) on receiving lens 18 is observed, and the other station's, station 11, transmitter lens alignment is adjusted by use of jack screws 40 and 42 and the other jack screws n the assembly. When viewing of display 82 indicates that received laser beam 24 is centered on receiving lens 18, the same alignment procedure is repeated while viewing station 11 and adjusting station 10. When both steps are completed, parallelism of the two transmitted laser beams, travelling side by side but in opposite directions, is assured.

By means of the present invention it is therefore possible to have properly aligned operating field stations, with two oppositely directed laser beams which are parallel. Moreover, since all units are initially aligned during test so the transmitted beam is parallel to the cabinet, all units are, in fact, interchangeable by merely field aligning the cabinets.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, there could be a greater or lesser number of threaded rods supporting the mounting block and the photodetector could be mounted by other means.

Moreover, the jack screws could have means other than screwdriver slots for turning them.

What is claimed as new and for which Letters Patent of the United States are desired to be secured is:

1. An apparatus for alignment of a laser beam transmitted from a fixed laser transmitting-receiving station so that the transmitted beam can be made parallel to a beam received by the same station, comprising:

a mounting plate;

a laser source attached to the mounting plate by a means preventing relative movement between the laser source and the mounting plate;

a lens attached to the mounting plate by a means preventing relative movement between the lens and the mounting plate, with the lens oriented so that its centerline is parallel to and centered upon a beam generated by the laser source, and with the lens projecting from one face of the mounting plate;

a support surface which forms part of the outside surface of the laser transmitting-receiving station, the support surface being rigidly attached to a station support means, and the support surface including a clearance hole through which the lens penetrates, a pivot means attached to the support surface and engaging the lens, and at least two threaded through holes; and at least two threaded rods each with one end screwed into the threaded holes in the support surface and the other end projecting toward and contacting the mounting plate, with the end within the threaded hole containing a means by which to turn the threaded rod, the turning means being accessible from outside the laser transmitting-receiving station.

2. The apparatus of claim 1 further comprising a second lens attached to the support surface so that it focuses light falling on the support surface, and a photodetector mounted at the station in a fixed relationship to the station support means and oriented so that the beam focused by the second lens is directed to the photodetector.

3. The apparatus of claim 1 wherein the pivot means engaging the lens is a screw within a threaded hole in the support surface which contacts a lens mount to which the lens is attached, thus locking the lens mount into the support surface but permitting the lens to pivot relative to the support surface.

4. The apparatus of claim 1 further including adjustment means for the lens to permit adjustment of the diameter of a beam being transmitted through the lens.

* * * * *